C. UEBELMESSER.

FILM GUIDE CONTROL.

APPLICATION FILED JUNE 11, 1919.

14,694.

Reissued July 22, 1919.

WITNESSES:

S. Swing

Albert H. Bandy

INVENTOR

Charles Uebelmesser.

UNITED STATES PATENT OFFICE.

CHARLES UEBELMESSER, OF NEW YORK, N. Y., ASSIGNOR TO CRU PATENTS CORPORATION, A CORPORATION OF NEW YORK.

FILM-GUIDE CONTROL.

14,694. Specification of Reissued Letters Patent. Reissued July 22, 1919.

Original No. 1,300,057, dated April 8, 1919, Serial No. 15,070, filed March 17, 1915. Application for reissue filed June 11, 1919. Serial No. 303,529.

*To all whom it may concern:*

Be it known that I, CHARLES UEBELMESSER, a subject of the Emperor of Germany, residing at New York city, county of New York, State of New York, have invented certain new and useful Improvements in Film-Guide Controls, of which the following is a full, clear, and exact description.

This invention relates to film manipulating machines or the like.

The object of my invention is to provide a device controlled by the film to control the function of the various guiding mechanisms in motion picture machines or the like.

A further object of my invention is to vary the space between the film guides at desired times and to hold in a fixed position movable guide means during the threading and loop making operations when a film is about to be fed through the machine.

In attaining the objects in my invention, I employ a movable guide roller, located preferably below the lower feed sprocket, and the movement of said roller is actuated by a lever upon the various devices employed in handling the film in motion picture machines.

The scope of my invention will be pointed out in the claims.

In the accompanying drawings illustrative of this specification, I have illustrated a way of adaptation of this invention in motion picture machines, and it is to be understood that variations in the details of construction in the type of the device may be made without departing from the spirit of the invention or exceeding the scope thereof.

Figure 1:
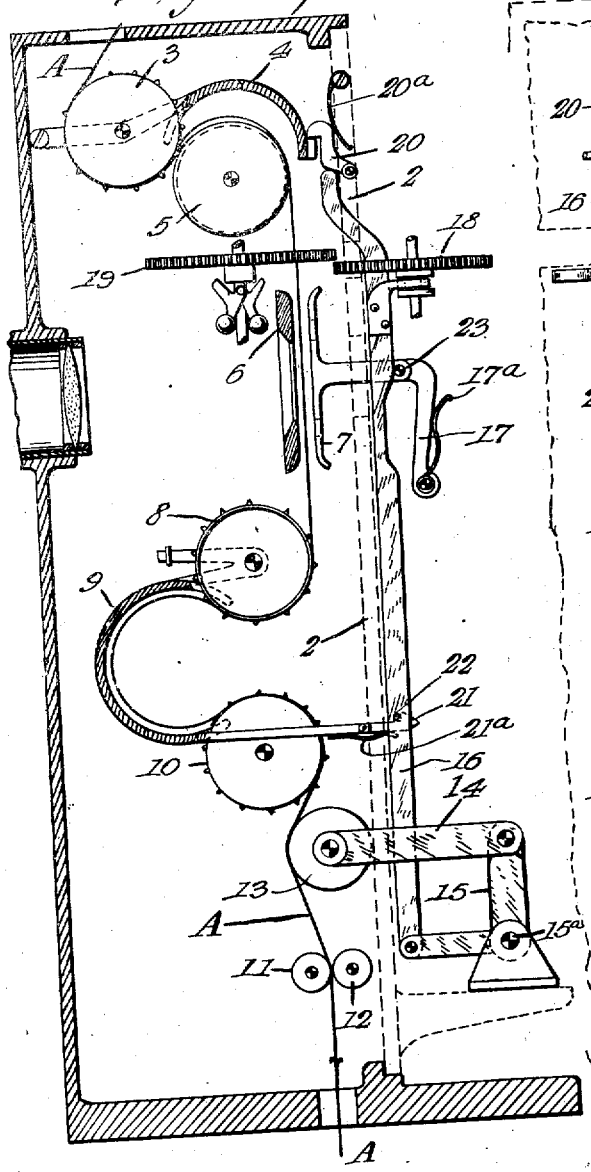
Figure 1 is a view in vertical section through a motion picture machine showing the relative positions of my device when fitted to a moving picture exhibiting apparatus.
Figure 2:
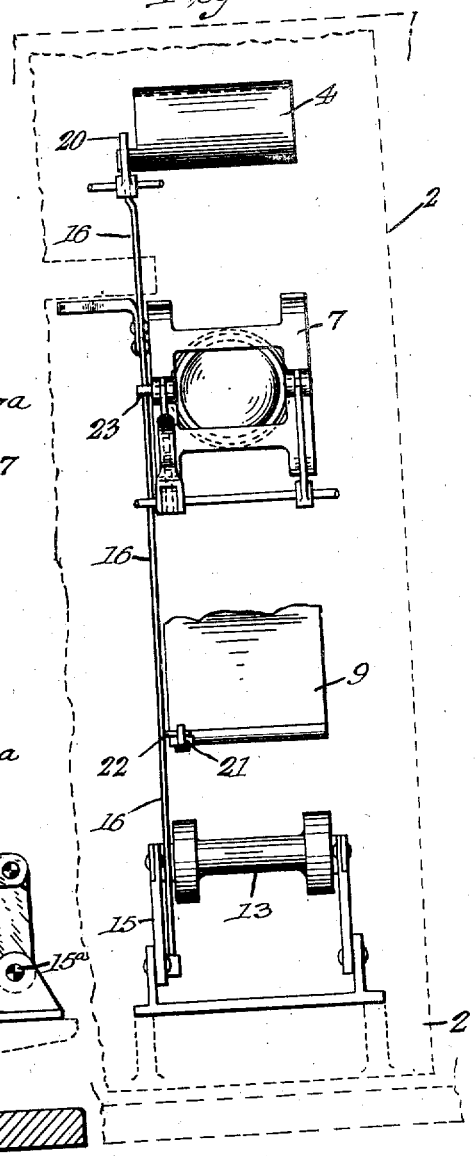
Fig. 2 is a sectional view upon the device set into the back of a motion picture machine guide door, dotted lines giving the approximate outlines of said guide door in which device is mounted.

Referring now to the drawing, 1 designates the frame of the motion picture machine; 2 designates the usual guide door on a motion picture machine; 3 the upper continuously driven feed roller; 4 is a swingable loop making guide; 5 a guide roller; 6 the aperture plate; 7 a pressure guide adjacent to the aperture; 8 the intermittently driven feed roller; 9 a movable film guide or loop forming pocket; 10 the lower continuously driven feed roller; 11 and 12 are two guide rollers from which the film is received and taken up by the usually frictionally driven film reel; 13 is the control roller bearing upon the film; 14 a movable bracket in which roller 13 is mounted; 15 is an intermediate bracket pivoted on pin 15ª; 16 is a sliding bar pivotally connected with bracket 15. 17 is a swingable tension bracket mounted in door 2 and connected with the pressure guide 7. 18 is a gear mounted on shift bar 16 to transmit power to a fire shutter as used in connection with exhibiting apparatus now in general use. 19 is a gear actuated by a governor adapted to transmit motion to gear 18 when said gear 18 is brought in alinement therewith. 20 is a snap lock mounted in door 2 engaging the upper loop forming guide. 21 is a snap lock mounted on lower loop forming guide 9. 22 is a pin mounted in slide bar 16 and engaging snap lock 21. 23 is a pin mounted in 17 and 7 and engaged by lock bar 16. Character A indicates the film itself.

In presenting the film A to the feed roller 3 and imparting motion thereto the film is forced into loop forming guide 4, and from there down past the aperture over the intermittent roller 8 into loop forming pocket 9 over continuously running feed roller 10, past guide control roller 13 and led between rollers 11 and 12 into receiving box and film reel. To push the film through this above described route, its passage must be unobstructed so that this whole performance may be accomplished automatically. Therefore, the loop forming guides 4 and 9 must be held in fixed position, and the usual pressure guide 7 must be held away from the aperture, but still in close proximity. The fire shutter must also be out of operation and stay closed till the film is safely led through the machine and taken up by the receiving reel. After this has been accomplished, the pressure guide 7 must provide pressure to the film adjacent to the aperture, and the loop forming guides 4 and 9 must be unlocked so that they may move slightly away from the surface of the film when the machine is in operation. This is all accomplished in my device simply and automatically. As soon as the film has arrived on the receiving reel and is taken up thereby, it is pulled into a straight line, thereby pushing the roller 13 backward together with bracket 14. Bracket 15 is also moved and will move sliding bar 16 upward by reason of its connection therewith. As soon as sliding bar 16 has moved upward, the pin 22 releases snap lock 21 and loop forming guide 9 is free for independent actions, and likewise snap lock 20 releases loop forming guide 4. Pin 23 is now opposite a depression in the slide bar 16 and therefore pressure guide 7 will be brought into contact with the film and receives tension from the spring 17[a]. Gear 18 will also be brought into alinement with gear 19 by the raising of the slide bar 16, so that motion may be transmitted to a fire shutter device. Should at any time the tension in the film become slack or if the film leave the apparatus, then the slide bar 16 will fall back, since the film will no longer obstruct roller 13 in its desired forward movement. The aperture 6 will again become relieved from the pressure guide 7, and the snap locks 20 and 21 will again lock the loop forming guides 4 and 9 and the gear 18 is again moved out of alinement with gear 19.

The snap locks 20 and 21 are pivotally mounted in member 2 and are under pressure of springs 20[a] and 21[a] to insure engagement between the lock 20 and the guide 4 and between the lock 21 and the pin 22 when no film is pressing in the guides 4 and 9.

What I claim as my invention is:

1. In a motion picture machine, the combination with movable film guides, means for locking said guides against movement and means controlled by the completion of threading film through said machine for unlocking said guides.

2. In a motion picture machine, movable guide members for the loops of the film in said machine, a movably mounted lever adjacent said guide members, having means for engaging the same to lock them against movement and to release them upon movement of said lever, and means carried by said lever, and projecting against the surface of the film to be moved thereby when said film is under tension.

3. In a motion picture machine, a device for automatically varying the space between the aperture and a pressure guide opposite thereto consisting of a movably mounted lever located on said machine and bearing against said pressure guide to move the same upon movement of said lever, and means for operating said lever by the tension of the film passing thereby.

4. In a motion picture machine, a movably mounted aperture guide for the film, means for normally holding said guide in an inoperative position and means controlled by the tension of the film for releasing said guide.

5. In a motion picture machine, a device for automatically varying the space between the aperture and a guide opposite thereto comprising a shiftable lever for normally holding said guide in an inoperative position and means controlled by the tension of the film passing through said guide for actuating said lever to release said guide.

Signed at New York city, New York, this 15th day of March, one thousand nine hundred and fifteen.

CHARLES UEBELMESSER.

Witnesses:
ROBERT RICHTER,
F. F. WEISS.